Dec. 26, 1961 C. D. KEITH ETAL 3,014,365
APPARATUS FOR TESTING THE BRIDGING STRENGTH
OF ELONGATED SOLID PARTICLES
Filed April 9, 1957 2 Sheets-Sheet 2
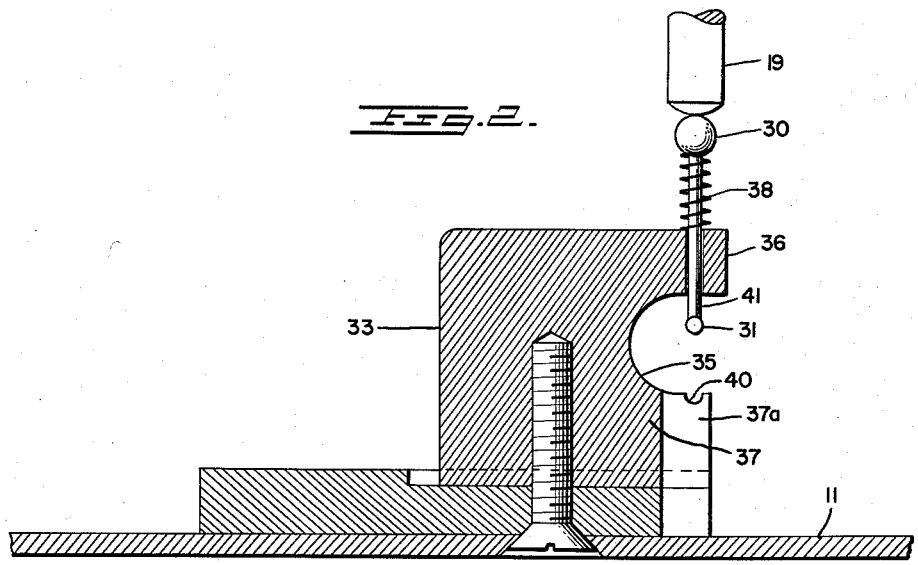
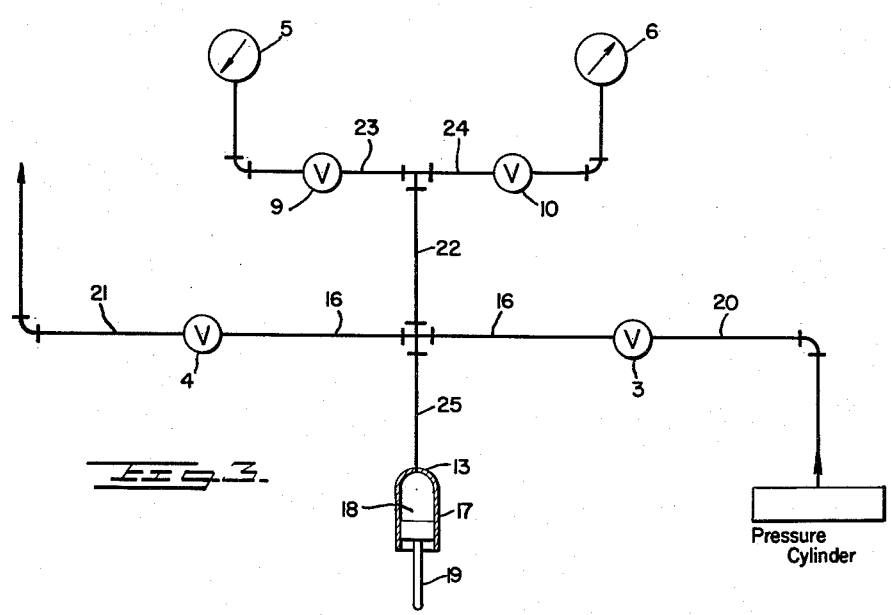
INVENTORS
JOHN J. PIROS
CARL D. KEITH
BY *Adams, Froward & McLean*
ATTORNEYS _United States Patent Office_

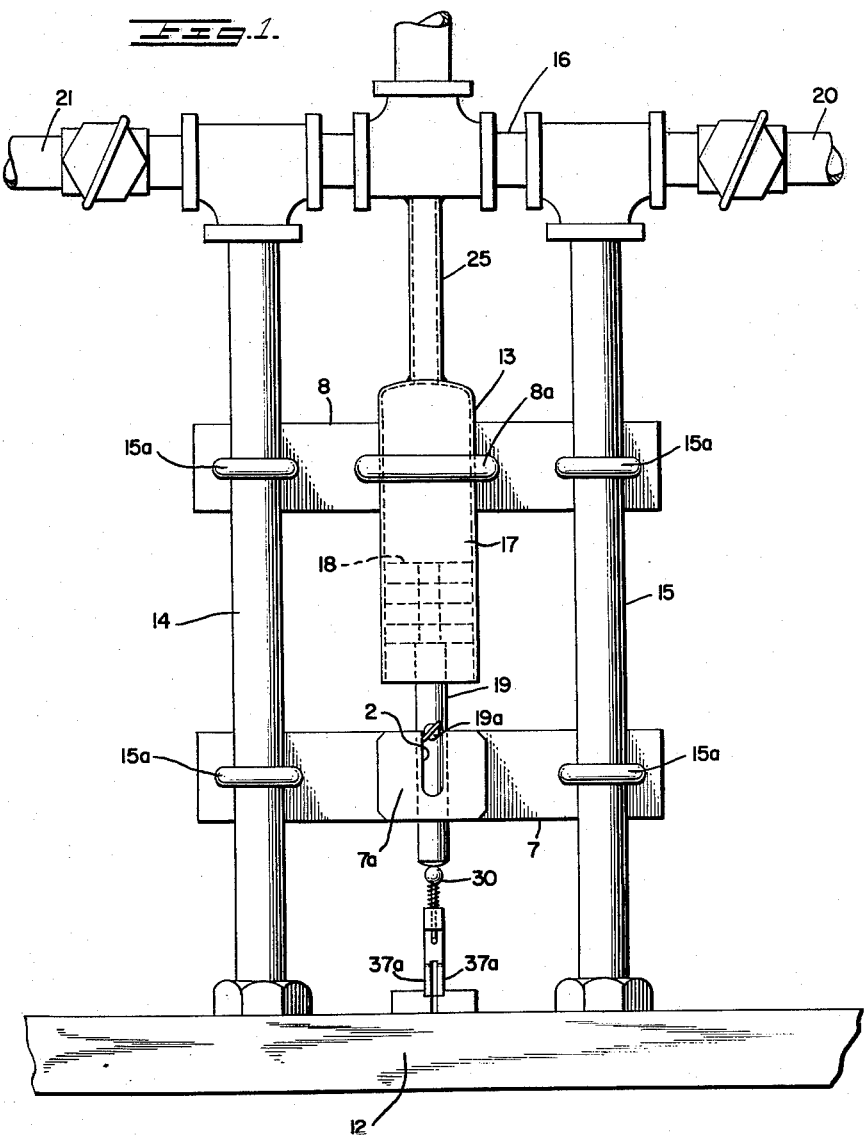

3,014,365
Patented Dec. 26, 1961

3,014,365
APPARATUS FOR TESTING THE BRIDGING STRENGTH OF ELONGATED SOLID PARTICLES
Carl D. Keith, Munster, Ind., and John J. Piros, Homewood, Ill., assignors to Sinclair Research Inc., a corporation of Delaware
Filed Apr. 9, 1957, Ser. No. 651,661
4 Claims. (Cl. 73—100)

This invention relates to a testing apparatus and more particularly, to a new and useful device for testing the bridging strength of catalytic materials.

The data obtained from testing devices designed to determine physical characteristics of catalytic materials are important factors for determining the ability of the catalyst to stand up in operations for which it is designed. For example, catalyst crushing strength, which is a load bearing factor over the full length of a catalyst particle, is frequently employed in determining the maximum bed height which can be used without undue catalyst breakage. It has been found, however, that crushing strength tests do not afford a satisfactory measure of an elongated catalyst pellet's ability to remain unbroken when disposed in a bed of substantial height. The fact that such tests are not adequate is apparently related to the presence of micro-fissures and cracks occurring in catalysts as occasioned by their treatment during steps of preparation, e.g. extrusion, tabletting, drying, calcination, etc. Thus, when elongated catalysts particles are arranged in a system employing a fixed bed for example, the application of force apparently causes the fissures to expand which eventually results in catalyst breakage. Breakage often leads to undesirable channeling of reactants and undue amounts of catalyst fines which decrease the voids in the bed causing an increase in pressure drop for the materials passing through the bed. However, this tendency to break is not established through crushing tests apparently because the micro-fissures do not materially weaken the crushing resistance of the catalyst pellets.

In order to obtain a better determination with regard to the ability of elongated catalyst particles to resist breakage when disposed in a bed, we have devised an apparatus, for determining the bridging strength of the catalytic materials. The bridging data obtained by using our device can be directly correlated with micro-fissures in catalyst materials and, as above mentioned, the results obtained are important considerations in determining the suitability of the catalyst for a particular operation. It was found, for instance, that as the number of micro-fissures increased, the bridging strength of the catalyst particles suffered a corresponding decrease and this could not be determined by the conventional crushing strength tests. These are important findings particularly when it is realized that these micro-fissures are not detectable to the eye and frequently mere inspection under a microscope will not reveal some of them. Thus, it became highly desirable to develop a testing device which would indicate the degree of micro-fissuring to establish the suitability of batches of catalyst for use in commercial units where beds of considerable depth are employed.

For a description of our invention, reference is made to the following drawings, in which:

FIGURE 1 is a front elevational view of a catalyst bridge testing device constructed in accordance with the principles of this invention;

FIGURE 2 is a fragmentary enlarged elevational view partly in section of the device shown in FIGURE 1 illustrating more clearly the manner in which the bridging strength of the elongated catalyst particle is determined; and FIGURE 3 is a simplified schematic drawing of the pneumatic system employed for measuring test pressures.

Referring to FIGURE 1, a device exemplary of my testing machine includes a base member 12 upon which is mounted two secured, solid rod-like members 14 and 15 extended in upright relation from supporting base 12 and tied together by a stationary supply line 16. As shown, line 16 is comprised of hollow piping and connections made of steel but it could be comprised of other cored materials. Actuator assembly 13 includes cylinder 17, piston 18 located therein and a piston rod 19 which extends downwardly through the cylinder and beyond a yoke bar 7. In the middle of bar 7 is a forwardly projecting guide member 7a which is drilled through to receive rod 19 loosely. In the front of guide 7a is a slot 2 which communicates with the hole drilled in guide 7a. Rod 19 threadingly receives screw 19a. The screw serves as a guiding member when disposed in slot 2 and by raising rod 19 and then turning it in either direction the screw 19a can be rested on guide 7a to hold the rod in non-operative position. The upper end of cylinder 17 communicates via a pipe line 25 with supply line 16, which in turn is connected to a source of fluid pressuring medium such as air. The lower terminal portion of piston rod 19 acts as plunger shaft for ball 30.

Yoke bars 7 and 8, are supported on the rod-like members 14 and 15 by means of U bolts 15a or other suitable brackets. Assembly 13 is supported on yoke bar 8 by means of a U bolt 8a. The catalyst bridge apparatus, as more clearly shown in FIGURE 2 of the drawing, is in the form of an upright frame 33, constructed with a concaved portion 35 defining a forwardly projecting top section 36 and a lower forwardly projecting section 37.

The forwardly projecting top portion 36 of frame 33 houses a ram assembly consisting of a ball-like element 31, ball 30, tension coil 38 and a vertical reciprocating rod 41. Tension coil 38 is secured to the upper end of rod 41 and coils downwardly for about one-half the length of the shaft, resting on the top portion of section 36. The rod 41 passes through a vertical bore in 36 and against compression of spring 38 is capable of up and down movement independently of any binding action in the vertical bore.

Both ends of rod 41 are concaved and are adapted to receive the ball-like member 31 and ball 30 which are secured thereto. The members 30 and 31 may be of any appropriate form according to the test being made, but in this instance are hardened steel balls such as the balls customarily used in making a Brinell hardness test. The lower section or anvil 37 comprises forwardly projecting, spaced support members 37a having opposed transverse grooves 40 adapted to receive elongated catalyst particles. Grooves 40 are located so that ball 31 passes between the spaced members 37a when it is forced downwardly by actuation of rods 19 and 41. Frame 33 is attached to plate 11 by a screw and the entire unit is appropriately secured, preferably adjustably secured, to base 12 by any suitable means.

In operating the device shown in FIGURES 1 and 2, a pressured cylinder of air or other gas can be employed to supply suitable pressures to piston 18 within assembly 13. Although a pressured cylinder of air may be employed as the means for providing a slow increase of pressure to piston 18 within assembly 13, other well-known pressure devices having control mechanisms for providing the required pressure increase can also be used. As schematically illustrated in FIGURE 3, the upper end of assembly 13 communicates via lines 25 and 16 with lines 20 and 21, which serve as a supply line and discharge line, respectively, for line 16. Line 25 also communicates with piping 22 which leads to gauges 5 and 6 via lines 23 and 24, respectively. The pressure gauges are of the conventional type and are calibrated so as to indicate low pressures on gauge 5, e.g. less than 35 ounces, and high pressures up to 90 ounces or more on gauge 6.

In actual operation for determining bridging strength of various type catalysts, a representative sample of catalyst extrudate is laid across grooves 40 so as to form a bridge type arrangement. The sample should not be visibly cracked and is approximately a 3/16" length of 1/16" diameter extrudate. Valve 4 is opened slightly (to prevent pressure surge in piston 18) and valve 3 is slowly opened so that pressure is applied to the piston within cylinder 17 which results in a vertical downward movement of member 31 against the catalyst specimen by means of the force applied to ball 30 through piston rod 19. The force of member 31 against the catalyst is increased slowly until the specimen cracks or breaks. Twenty specimens from each representative portion of the catalyst sample are tested and the bridging strength is reported as the average pressure in pounds or ounces required to break or crack the catalyst.

Measurement of the pneumatic pressure required to break or crack the catalyst is carried out by closing valve means 9 and opening valve 10 causing the direct transmission of pressure from the pressure cylinder to communicate with the pressure gauge 6 via the piping 22 and 24, or by closing valve means 10 and opening valve 9 if low pressures are contemplated. Having once measured the breaking strength, release of the system and the upward movement of penetrator 31 is brought about by closing valve 3, permitting the pressure to vent through valve 4, and by hand raising screw 19A. It is seen from the above description that we have provided a simple, inexpensive and effective device for determining the bridging strength of extruded catalytic materials. It will, of course, be understood that various changes in details of construction and arrangement of parts can be made without departing from the scope of the invention.

We claim:

1. An apparatus for testing the bridging strength of an elongated solid particle which comprises two vertically positioned spaced apart support means having aligned grooves on their upper ends conforming to the shape of said particle for supporting the particle in a horizontal position at its opposite ends while leaving the mid-portion of the particle unsupported, a vertical reciprocating rod having a ball-like member at its lower end positioned above said support means, guide means permitting the downward movement of said rod between said support means, means for applying a slowly increasing force against said rod and ball-like member resulting in the downward movement of said ball against the mid-portion of a particle held by said support means, and means for measuring said force.

2. The apparatus of claim 1 wherein said guide means comprises a frame having a vertical bore housing said reciprocating rod and said rod is within a tension coil resting upon the frame whereby compression of said coil permits movement of the rod in the vertical bore.

3. The apparatus of claim 1 wherein the means for applying a slowly increasing force comprises a reciprocating piston housed in a cylinder, a piston rod attached to said piston and positioned above said vertical reciprocating rod, a source of pressured gas and means for releasing said gas to actuate said piston whereby the vertical reciprocating rod and ball-like member are moved downwardly against a particle held by said support means.

4. An apparatus for testing the bridging strength of an elongated solid particle which comprises two vertically positioned spaced apart support means having aligned grooves on their upper ends conforming to the shape of said particle for supporting the particle in a horizontal position at its opposite ends while leaving the mid-portion of the particle unsupported, a vertical reciprocating rod having a ball-like member at its lower end positioned above said support means, guide means permitting the downward movement of said rod between said support means, said guide means comprising a frame having a vertical bore housing said reciprocating rod within a tension coil resting upon the frame, means for applying a slowly increasing force against said rod and ball-like member comprising a reciprocating piston housed in a cylinder, a piston rod attached to said piston and positioned above said vertical reciprocating rod, a source of pressurized gas and means for releasing said gas to actuate said piston whereby the ball-like member is moved downwardly against the mid-portion of a particle held by said support means, and means for measuring said slowly increasing force.

References Cited in the file of this patent
UNITED STATES PATENTS

| | | |
|---|---|---|
| 2,338,338 | Kieckhefer | Jan. 4, 1944 |
| 2,645,936 | Albrecht | July 21, 1953 |
| 2,671,344 | Raven | Mar. 9, 1954 |
| 2,699,060 | Safford | Jan. 11, 1955 |